United States Patent

Jensen

[11] Patent Number: 5,614,449
[45] Date of Patent: Mar. 25, 1997

[54] MAN-MADE VITREOUS FIBRES

[75] Inventor: Soren L. Jensen, Copenhagen, Denmark

[73] Assignee: Rockwool International A/S, Denmark

[21] Appl. No.: 532,773

[22] PCT Filed: Feb. 10, 1995

[86] PCT No.: PCT/EP95/00480

§ 371 Date: Sep. 28, 1995

§ 102(e) Date: Sep. 28, 1995

[87] PCT Pub. No.: WO95/21799

PCT Pub. Date: Aug. 17, 1995

[30] Foreign Application Priority Data

Feb. 11, 1994 [DK] Denmark ................................. 0184/94
Dec. 30, 1994 [GB] United Kingdom ................. 9426391

[51] Int. Cl.$^6$ ............................. C03C 13/02; C03C 13/06
[52] U.S. Cl. ............................. 501/38; 501/36; 501/72
[58] Field of Search ............................. 501/38, 36, 72

[56] References Cited

U.S. PATENT DOCUMENTS

| | | | |
|---|---|---|---|
| 4,205,992 | 6/1980 | Morgensen et al. | 501/36 |
| 5,108,957 | 4/1992 | Cohen et al. | 501/35 |
| 5,250,488 | 10/1993 | Thelohan et al. | 501/36 |
| 5,312,806 | 5/1994 | Morgensen | 501/36 |
| 5,332,698 | 7/1994 | Nyssen et al. | 501/38 |
| 5,332,699 | 7/1994 | Olds et al. | 501/38 |

FOREIGN PATENT DOCUMENTS

| | | | |
|---|---|---|---|
| 6002590 | 2/1991 | Australia | C03C 003/087 |
| 0009418 | 4/1980 | European Pat. Off. | C03C 3/04 |
| 0412878A1 | 2/1991 | European Pat. Off. | C03C 13/00 |
| 0459897A1 | 12/1991 | European Pat. Off. | C03C 13/06 |
| 2662688 | 12/1991 | France | C03B 37/01 |
| 8705007 | 8/1987 | WIPO | C03C 13/00 |
| 8912032 | 12/1989 | WIPO | C03C 13/00 |
| 9209536 | 6/1992 | WIPO | C03C 13/00 |
| 9307741 | 4/1993 | WIPO | A01G 31/00 |
| 9322251 | 11/1993 | WIPO | C03C 13/06 |
| 9414717 | 7/1994 | WIPO | C03C 13/06 |

OTHER PUBLICATIONS

Ceramic Bulletin vol. 57, No. 6, (1978), Ohta, pp. 602–604, Jun.
Indian Ceramic, Jul. 1968, Mitra, pp. 97–102.

*Primary Examiner*—Mark L. Bell
*Assistant Examiner*—Louis M. Troilo
*Attorney, Agent, or Firm*—Brumbaugh, Graves, Donohue & Raymond

[57] ABSTRACT

A product comprising man made vitreous fibers formed of a composition which comprises, by weight of oxides:

| | |
|---|---|
| $SiO_2$ | 45–60% |
| $Al_2O_3$ | 0.5–4.0% |
| $TiO_2$ | 0.1–4% |
| FeO | 6–12% |
| CaO | 10–25% |
| MgO | 8–18% |
| $Na_2O$ | 0–2.5% |
| $K_2O$ | 0–2% |
| $Na_2O + K_2O$ | 0–6% |
| $P_2O_5$ | 3–10% | wherein the product has a sintering temperature of at least 950° C. and wherein above 50% by weight of the iron is present as ferrous.

21 Claims, No Drawings

MAN-MADE VITREOUS FIBRES

This invention relates to man-made vitreous fibres (MMVF) which are durable in use, which have a solubility in biological fluid which is considered to be acceptable, which can be made from readily available materials by convenient techniques.

MMV fibres are made from vitreous melt, such as of rock, slag, glass or other mineral melts. The melt is formed by melting in a furnace a mineral composition having the desired analysis. This composition is generally formed by blending rocks or minerals to give the desired analysis.

Although there is no scientific evidence establishing that there is a health risk associated with the manufacture and use of MMV fibres, commercial interests have led manufacturers to provide MMV fibres that retain the required physical properties of MMV fibres (e.g., durability at elevated temperatures and under humid conditions) but which can also be alleged to be of improved biological safety.

This allegation of improved safety is usually made on the basis of an in vitro test that examines the dissolution rate or degradability of the fibres in a liquid which is intended to simulate lung liquid, such as Gamble's solution at about pH 7.5, for instance pH 7.4 to 7.8.

Numerous patent applications have been published describing fibres that give enhanced dissolution rate in such an in vitro test, such as WO87/05007, WO89/12032, EP 412878, EP459897, WO92/09536, WO93/22251 and WO94/14717.

A characteristic of many of these patent applications, and of fibres which are alleged to have enhanced dissolution rate in such in vitro tests, is that the fibre should have reduced aluminium content. For instance it is stated in WO87/05007 that the $Al_2O_3$ amount must be below 10%. The aluminium content of rock wool and slag wool is generally in the range 5 to 15% (measured as $Al_2O_3$ by weight) and many of these allegedly biologically suitable fibres have an aluminium content of below 4%, and often below 2%.

A further characteristic is that phosphorous should be included in order to increase the dissolution rate. For instance in WO92/09536 it is stated that the weight ratio of $P_2O_5$ to the sum of $Al_2O_3$ and iron oxide must be about 0.4 to 6, preferably about 0.5 to 2 and in EP 412,878 it is stated that there must be at least 0.1% $P_2O_5$ if the amount of $Al_2O_3$ is more than about 1%. The fact that $P_2O_5$ increases solubility and reduces durability in mineral products, both fibrous and non-fibrous, was additionally well known in the art, for instance from Uhlman 1978 pages 359 to 365; Ceramic Bulletin Volume 57 No.6, 1978, Ohta, pages 602 to 604; and Indian Ceramics, July 1968, Mitra, pages 97 to 102; Materials Research Society Proceedings, ed McVay, Volume 26, Plodinek pages 755 to 761; and Glasuren and Ihre Farben 1973.

Although the inclusion of $P_2O_5$ and the total or substantial elimination of $Al_2O_3$ gives satisfactory solubility at about pH 7.5 in the common in vitro solubility test, the requirement to use such a formulation incurs a number of serious problems. In particular, the requirement to use such a composition tends to detract from the inherent advantages of many rock or slag wool manufacturing processes and products. Such products are normally made from readily available materials and blends of materials by processes that have been developed to produce the products in good yield. Satisfactory production necessitates that the products should have melt viscosity properties that are rather accurately controlled, since significant variation in the viscosity from the optimum can have a significant and undesirable effect on manufacture of the product. For instance it can significantly influence the fibre diameter and the percentage of shot (coarse fibres or pearls) in the product. The compositions that are known for making fibres which have the specified in vitro solubility at around pH 7.5 tend to give unsatisfactory melt viscosity properties and can generally only be made from a very restricted selection of raw materials.

An inherently desirable property of MMVF products is that they should have good thermo stability and durability. Glass wool is typically thermostable at temperatures up to about 650° C. whereas rock wool is generally capable of withstanding temperatures of up to about 1,000° C. It is necessary that MMF products should have good thermo stability and mechanical stability even after prolonged exposure to ambient humidity. For instance MMVF products being used for fire protection, noise protection or sound protection may need to be in place for very prolonged periods during which they may be exposed to repeated variations in atmospheric humidity, and it is necessary that unacceptable reduction in their properties should not occur during this prolonged usage. The literature, such as the Uhlman, Ohta, Mitra, Plodinek and Glasuren references discussed above, all indicate that the presence of phosphate in the fibres will in fact reduce the durability of the fibres. Since the phosphate is being included in order to increase the solubility at around pH 7.5, reduced durability to ambient moisture at about the same pH would be predictable.

The object of the present invention is to provide MMVF products which have a good dissolution rate by an in vitro test and which can be made easily from inexpensive starting materials and which give good durability during prolonged usage, as a result of which they can maintain good thermo stability, fire resistance and other properties.

Throughout this specification, elemental analyses are quoted by weight and calculated as oxides. For simplicity, iron oxide is quoted as FeO even though some iron may be present as $Fe_2O_3$.

According to the invention, we provide a product comprising MMVF formed of a composition which includes, by weight of oxides,

| | |
|---|---|
| $SiO_2$ | 45–60% |
| $Al_2O_3$ | 0.5–4% |
| $TiO_2$ | 0.1–4% |
| FeO | 5–12% |
| CaO | 10–25% |
| MgO | 8–18% |
| $Na_2O$ | 0–4% |
| $K_2O$ | 0–2% |
| $Na_2O + K_2O$ | 0–6% |
| $P_2O_5$ | 2–10% |
| Others | 0–10% |

These fibres have good solubility by in vitro testing (as discussed below) but we surprisingly find that the inclusion of phosphate in combination with the specified amounts of titanium, iron, calcium and magnesium results in fibres having very satisfactory durability and other mechanical properties (for instance as explained below) despite prolonged exposure to ambient humidity and despite the high solubility, as shown by in vitro tests at around neutral pH.

Also, the composition can be made from conventional and readily available raw materials and blends of raw materials. Thus there is no need to exclude aluminium and, instead, it must be present in an amount of at least 0.5%. Similarly, there is no need to exclude titanium and it must be present, instead, in an amount of at least 0.1%. Further, its inclusion can contribute to the benefits of the products. Similarly, there is no need to exclude or minimise iron and it must, instead, be present in an amount of at least 5%.

A further advantage of the analysis is that the composition can have a very convenient melt viscosity, and this can facilitate manufacture.

The viscosity of the composition at 1400° C is usually at least 10 or 15 poise and is preferably at least 18 poise. Although it can be as high as, for instance, 60 or 70 poise it is generally below 40 poise and preferably it is not more than 30 poise. The proportions of components should be selected to provide this.

The viscosity in poise at 1400° C is calculated according to Bottinga and Weill, American Journal of Science Volume 272, May 1972, page 455–475. As $P_2O_5$ is not included in this calculation, the presence of $P_2O_5$ is taken into consideration by equalizing 1 mole % of $P_2O_5$ with 2 mole % $SiO_2$+1 mole percent CaO. Laboratory tests have proved that this approximation is valid within actual chemical ranges.

The amount of $SiO_2$ is normally at least 50%. It is normally not more than about 56%, and preferably not more than 54%.

The amount of $Al_2O_3$ is normally at least 1%, and preferably is at least 1.5%. It is normally not more than 3% and preferably is not more than 2.5%.

The amount of $TiO_2$ is normally at least 0.2%. Often it is not more than 1.5 or 2%. Amounts of 0.2 to 0.6% are often suitable.

The amount of iron (measured as FeO) is usually at least 6% but normally it is not more than 9% or 10%. Preferably it is not more than 8%.

Although it is possible to make MMVF products in which the iron is wholly or mainly in the ferric state, in the invention it is preferred that above 50% by weight iron be in the ferrous state. Preferably at least 70% and most preferably at least 80%, of the iron is ferrous. For instance often at least 90 to 95% by weight of the iron is present in ferrous form in the MMVF products of the invention. This enhances the chemical and mechanical properties of the products.

The amount of CaO is usually at least 15%. Generally it is up to 23% but it can be not more than 20%.

The amount of MgO is generally at least 9%. Preferably it is not above 16%. It is usually below not more than about 14% and often is not more than 11%. The combination of 9–14% MgO with the iron permits a good sintering temperature and melt properties.

The total amount of alkali is generally at least 0.1% but usually is not more than 4%, and preferably it is not more than 2%. Accordingly the amount of each of sodium and potassium is preferably not more than 2.5 or 3%.

The amount of $P_2O_5$ is usually not more than 6% although it can be up to, for instance, 9%. The amount is usually at least 3%.

A variety of other elements may be present in an amount which is not more than 10% and is generally not more than 6% and preferably not more than 3%. Suitable elements include $B_2O_3$, BaO, $ZrO_2$, MnO and ZnO. The total amount of borate, if present, is usually not more than 5% and is usually less than the amount of $P_2O_5$.

A particular advantage of the use of around 6 or 7% iron oxide with around 20 to 23% calcium oxide is that this blend can easily be achieved by the use of converter slag as the raw material although it may be desirable to use other materials so as to reduce the amount of calcium.

A preferred product, which is convenient to manufacture and which gives a particularly useful combination of properties, is formed of a composition which includes, by weight of oxides

| | |
|---|---|
| $SiO_2$ | 50–56% |
| $Al_2O_3$ | 1.5–2.5% |
| $TiO_2$ | 0.1–1.5% |
| FeO | 6–8% |
| CaO | 15–25% |
| MgO | 8–12% |
| $Na_2O$ | 0–2% |
| $K_2O$ | 0–2% |
| $Na_2O + K_2O$ | 0.1–3% |
| $P_2O_5$ | 3–6% |
| Others | 0–5% |

The amount of CaO is preferably 15 to 23%, often 20 to 23%, and the amount of MgO is preferably 9 to 11%.

The sintering temperature is preferably at least 800° C and most preferably at least 900 and usually at least 950° C. Sintering temperature is determined as follows.

A sample (5×5×7.5 cm) of mineral wool made of the fibre composition to be tested was placed in a furnace preheated to 700° C. After 1.5 hours exposure the shrinkage and the sintering of the sample were evaluated. The method was repeated each time with a fresh sample and a furnace temperature 50° C above the previous furnace temperature until the maximum furnace temperature, at which no sintering or no excessive shrinkage of the sample was observed, was determined.

The dissolution rate can be determined by a stationary or flow-through technique. When determined by a stationary technique, as described below, the solubility at pH 7.5 is preferably at least about 20 nm per day. It can be up to, for instance, 50 nm per day or higher. When, as is preferred, the dissolution rate is measured by a flowthrough method, as defined below, the solubility at pH 7.5 is preferably at least 40 and most preferably at least 50 or 60 nm per day. It can be up to, for instance, 100 nm per day or can be even higher, for instance up to 150 nm per day.

The composition is typically formed by blending appropriate amounts of naturally occurring rock and sand materials and recovered waste materials, including converter slag, other slags, glass, foundry sand, limestone, magnesite, brucite, talc, serpentinite, pyroxenite, apatite, wollastonite, quartz sand, olivine sand, iron ore, dolomite and MMVF waste.

The composition can be converted to a melt in conventional manner, for instance in an electric furnace or in a cupola furnace. An advantage of the invention is that the composition can easily have a reasonably low liquids temperature (while maintaining adequate viscosity at 1400° C.).

The melt can be converted to fibres in conventional manner, for instance by a spinning cup process or by a cascade rotor process, for instance as described in WO92/06047.

The production of the melt is preferably conducted under reducing conditions, such as in a cupola furnace, so as to maximize the amount of ferrous iron compared to ferric iron.

The fibres may be formed into MMVF products in conventional manner by laying down the fibres in the presence of binder typically in an amount of 0.5 to 4%, often around 1 to 2% by weight of the product. Conventional MMVF binders can be used.

The durability of the fibres to exposure to ambient humidity over prolonged periods can be determined by the dynamic compression recovery and dynamic compression elasticity values determined below and the fibre durability index determined as described below. Preferred products of the invention are formed of MMV fibres which have a dynamic compression recovery (referred to below as Dynamic Recovery 2) of at least 67 mm and preferably at least 75 mm, for instance up to 95 mm or more. Preferred products have a dynamic compression elasticity (referred to below as Dynamic Recovery 80%) of at least 50 mm and most preferably at least 60 mm. For instance they may have a value up to 80 mm or more. Preferred products have a fibre durability index, determined as defined below, of not more than 3, and preferably 2 or less.

The invention also includes a product comprising man-made vitreous fibres formed of a composition which contains (measured as oxides) 0.5–4% $Al_2O_3$, 2–10% $P_2O_5$, 0.1–4% $TiO_2$ together with $SiO_2$, FeO, CaO and MgO and optionally other components, and wherein the fibres have a Through-flow Dissolution Rate at pH 7.5 of at least 60 nm per day, a Dynamic Recovery (2) value of at least 75 mm and a Dynamic Recovery (80%) value of at least 60 mm. This combination of properties is valuable and it was not predictable that it could be achieved using the defined amounts of $Al_2O_3$, $P_2O_5$ and $TiO_2$ in the composition.

In this specification, dissolution rate under the stationary technique is determined using the following test protocol.

300 mg of fibres were placed in polyethylene bottles containing 500 ml of a modified Gamble's solution (i.e., with complexing agents), adjusted to pH 7.5 or 4.5, respectively. Once a day the pH was checked and if necessary adjusted by means of HCl.

The tests were carried out during a one week period. The bottles were kept in water bath at 37° C. and shaken vigorously twice a day. Aliquots of the solution were taken out after one and four days and analyzed for Si on a Perkin-Elmer Atomic Absorption Spectrophotometer.

The modified Gamble's solution had the following composition:

|  | g/l |
|---|---|
| $MgCl_2.6H_2O$ | 0.212 |
| NaCl | 7.120 |
| $CaCl_2.2H_2O$ | 0.029 |
| $Na_2SO_4$ | 0.079 |
| $Na_2HPO_4$ | 0.148 |
| $NaHCO_3$ | 1.950 |
| $(Na_2$-tartrate$).2H_2O$ | 0.180 |
| $(Na_3$-citrate$).2H_2O$ | 0.152 |
| 90% tactic acid | 0.156 |
| Glycine | 0.118 |
| Na-pyruvate | 0.172 |
| Formalin | 1 ml |

The fibre diameter distribution is determined for each sample by measuring the diameter of at least 200 individual fibres by means of the intercept method and a scanning electron microscope or optical microscope (1000× magnification). The readings are used for calculating the specific surface of the fibre samples, taking into account the density of the fibres.

Based on the dissolution of $SiO_2$ (network dissolution), the specific thickness dissolved was calculated and the rate of dissolution established (nm/day). The calculations are based on the $SiO_2$ content in the fibres, the specific surface and the dissolved amount of Si.

The Dissolution Rate by the Flow-Through Method was determined as follows. Five hundred milligrams of fibres were placed in polycarbonate filter holders (diameter, 40 mm). A 0.8 μm filter was placed on the inlet side (top) and a 0.2 μm filter on the outlet side (bottom) to avoid loss of fibres during the test. Both filters were made of cellulose nitrate. The flow-rate of the modified Gamble's solution was kept at 100 to 110 ml/day by a peristaltic pump. The ratio of liquid flow to surface area of the fibres was 0.02 to 0.03 μm/s.

The pH of the solution was maintained at 7.7±0.2 by bubbling with $N_2/CO_2$ (95/5). For the solution at pH 4.5, HCl (3.7 ml/l) was added. The entire set-up, including storage containers, was maintained at 37°±0.7° C. Effluent solution was collected once a week during 2 hr and analyzed for Si and Ca. Analyses were made on a Perkin-Elmer atomic absorption spectrophotometer (AAS). Further details are given in Environmental Health Perspectives, Volume 102 Supplement 5, October 1994 page 83.

The Dynamic Compression stability tests of the fibres are conducted on MMVF products made to a particular specification, namely 1.4% binder content, density 30 kg/m³ and a thickness of 100 mm. Such products are made by conventional lay-down procedures of the fibres in the presence of binder.

A test piece formed from such a product having an area 200 mm by 200 mm is exposed during 28 days to a temperature of 70° ° C. and 100% relative humidity. A load of 0.25 kN/m² is applied to the surface and the height to which the piece is compressed is recorded in mm. A further load of 0.25 kN/m² is then applied and the height to which the test piece is compressed is recorded. The total load is then removed and the height to which the test piece recovers is recorded. This is the Dynamic Recovery (2) value. A high value indicates high retention of fibre strength despite the prolonged exposure to high humidity.

Dynamic compression elasticity is measured by subjecting a test piece which has been aged as described above to sufficient load to compress it to a height of 20 mm (i.e., 80% compression), and this load is maintained for 1 minute. It is then removed and the recovered height is recorded. This is the Dynamic Recovery (80%) value. Again, the higher values indicate higher elasticity and better retention of mechanical properties.

The fibre durability index is determined by visual examination on the product after the described hot ageing step. In particular, the sample is examined by scanning electron microscope and the surface is classified on a scale of from 1 to 5, where 1 indicates that the fibre surface is unchanged compared to the product before the ageing test and 5 indicates a surface which is heavily affected by corrosion.

The following are examples.

Examples A to I are examples of the invention, with examples E to I being preferred. Examples Y and Z are comparative, example Y being a low alumina low phosphate high calcium product having good dissolution properties but poor recovery properties, and example Z being a conventional rock fibre having typical alumina content and low phosphate, and which has good recovery properties but poor solubility properties. In each instance, a composition was formed by blending appropriate amounts of raw materials and was melted in a furnace in a reducing atmosphere and was fiberised by the cascade spinner technique, and was then formed into an MMVF product having a density of 30 kg/m³ and a binder content of 1.4%.

Examples A to D were performed using a 100 kg electrical furnace with a silicon carbide crucible. Examples E to H were performed using a cupola furnace.

A typical charge included briquettes formed of 36% quartz sand, 17% olivine sand, 12% iron ore, 11% dolomite, 12% MMVF waste and 12% cement, but the precise blend is varied to give the composition analysis required in each example.

| Example | A | B | C | D | E | F | G | H | Y | Z |
|---|---|---|---|---|---|---|---|---|---|---|
| % SiO$_2$ | 49.2 | 51.1 | 55.6 | 53.3 | 56.4 | 52.1 | 53.0 | 52.7 | 52.3 | 46.8 |
| % Al$_2$O$_3$ | 3.9 | 3.1 | 1.8 | 3.7 | 2.0 | 2.0 | 2.0 | 2.0 | 1.8 | 13.4 |
| % TiO$_2$ | 0.6 | 0.6 | 0.4 | 0.6 | 0.1 | 0.1 | 2.4 | 0.5 | 0.1 | 2.8 |
| % FeO | 5.1 | 9.6 | 8.8 | 5.7 | 7.2 | 7.6 | 8.2 | 7.1 | 0.5 | 6.3 |
| % CaO | 16.7 | 13.7 | 14.1 | 17.3 | 15.4 | 17.3 | 15.3 | 23.0 | 33.2 | 16.9 |
| % MgO | 16.4 | 11.5 | 11.7 | 15.4 | 14.3 | 15.3 | 14.3 | 10.1 | 11 | 9.6 |
| % Na$_2$O | 0.5 | 0.5 | 0.1 | 0.4 | <1 | <1 | <1 | <1 | <1 | 2.9 |
| % K$_2$O | 0.4 | 0.5 | 0.6 | 0.5 | | | | | | 1.2 |
| % P$_2$O$_5$ | 7.1 | 9.5 | 6.8 | 3.1 | 3.6 | 4.6 | 3.6 | 3.6 | <0.1 | <0.1 |
| Sintering Temp., °C. | 925 | >1100 | >1100 | 1025 | — | — | — | — | — | — |
| Solubility | | | | | | | | | | |
| Stationary pH 4.5 nm/day | 9 | 6 | 2 | 1 | — | — | — | — | — | — |
| Stationary pH 7.5 nm/day | 28 | 37 | 35 | 19 | — | — | — | — | — | — |
| Flow-through pH 7.5 nm/day | — | — | — | — | 75 | 75 | 50 | 100 | 102 | 1.5 |
| Dynamic Recovery (2) (mm) | — | — | — | — | 96 | 78 | 95 | 78 | 57 | 90 |
| Dynamic Recovery (80%) (mm) | — | — | — | — | 68 | 61 | 73 | 61 | 41 | 73 |
| Durability Index | — | — | — | — | 2 | 3 | 2 | 2 | 5 | 2 |
| Medium Fibre Diameter (μm) | — | — | — | — | 4.0 | 3.6 | 3.6 | 3.5 | 3.0 | 3.5 |

The novel fibres may be provided in any of the forms conventional for MMV fibres. Thus they may be provided as a product consisting of loose, unbonded fibres. More usually they are provided as a product bonded with a bonding agent, for instance as a result of forming the fibres and collecting them in the presence of binder in conventional manner. Generally the product is consolidated as a slab, sheet or other shaped article.

Products according to the invention may be formulated for any of the conventional purposes of MMV fibres, for instance as slabs, sheets, tubes or other shaped products that are to serve as thermal insulation, fire insulation and protection or noise reduction and regulation, or in appropriate shapes for use as horticultural growing media, or as free fibres for reinforcement of cement, plastics or other products or as a filler.

I claim:

1. A product comprising manmade vitreous fibres formed of a composition which comprises, by weight of oxides:

| | |
|---|---|
| SiO$_2$ | 45–60% |
| Al$_2$O$_3$ | 0.5–4% |
| TiO$_2$ | 0.1–4% |
| FeO | 6–12% |
| CaO | 10–25% |
| MgO | 8–18% |
| Na$_2$O | 0–2.5% |
| K$_2$O | 0–2% |
| Na$_2$O + K$_2$O | 0–6% |
| P$_2$O$_5$ | 3–10% | wherein the product has a sintering temperature of at least 950° C. and wherein above 50% by weight of the iron is present as ferrous.

2. A product according to claim 1 in which the amount of TiO$_2$ is 0.2 to 4% and the amount of CaO is 10 to 20% and the amount of SiO$_2$ is 50 to 60%, the amount of FeO is 6 to 10%, the amount of P$_2$O$_5$ is 3 to 9% and the amount of Na$_2$O is 0 to 2%.

3. A product according to claim 2 in which the amount of Al$_2$O$_3$ is 1.5 to 2.5%.

4. A product comprising manmade vitreous fibres formed of a composition which comprises, by weight of oxides:

| | |
|---|---|
| SiO$_2$ | 50–56% |
| Al$_2$O$_3$ | 1.5–2.5% |
| TiO$_2$ | 0.1–1.5% |
| FeO | 6–8% |
| CaO | [15]10–25% |
| MgO | 8–[12]18% |
| Na$_2$O | 0–2% |
| K$_2$O | 0–2% |
| Na$_2$O + K$_2$O | 0.1–3% |
| P$_2$O$_5$ | 3–6% |
| [Others | 0–5%] | wherein the product has a sintering temperature of at least 950° C. and wherein above 50% by weight of the iron is present as ferrous.

5. A product according to claim 4 in which the amount of CaO is 15–23% and the amount of MgO is 9 to 11%.

6. A product according to claim 1 in which at least 70% by weight of the iron is ferrous.

7. A product according to claim 1 wherein the composition has a viscosity at 1400° C. of 10 to 70 poise.

8. A product according to claim 1 in which the viscosity at 1400° C. is 15 to 30 poise.

9. A product according to claim 1 in which the fibres have a Through-Flow Dissolution Rate at pH 7.5 of at least 60 nm per day.

10. A product according to claim 1 in which the fibres have a Dynamic Recovery (2) value of at least 75 mm.

11. A product according to claim 1 in which the fibres have a Dynamic Recovery (80%) value of at least 60 mm.

12. A product according to claim 1 in which the fibres have a durability index of up to 2.

13. A product according to claim 4 in which at least 70% by weight of the iron is ferrous.

14. A product according to claim 4 in wherein the composition has a viscosity at 1400° C. of 10 to 70 poise.

15. A product according to claim 4 in which the viscosity at 1400° C. is 15 to 30 poise.

16. A product according to claim 4 in which the fibers have a Through-Flow Dissolution Rate at pH 7.5 of at least 60 nm per day.

17. A product according to claim 4 in which the fibers have a Dynamic Recovery (2) value of at least 75 mm.

18. A product according to claim 4 in which the fibers have a Dynamic Recovery (80%) value of at least 60 mm.

19. A product according to claim 4 in which the fibers have a durability index of up to 2.

20. A product comprising man-made vitreous fibres wherein the fibres have a Dynamic Recovery (2) value of at least 75 mm and the fibres are formed of a composition which comprises, by weight of oxides:

| | |
|---|---|
| $SiO_2$ | 45–60% |
| $Al_2O_3$ | 1.5–2.5% |
| $TiO_2$ | 0.1–4% |
| FeO | 6–9% |
| CaO | 10–25% |
| MgO | 8–18% |
| $Na_2O$ | 0–2.5% |
| $K_2O$ | 0–2% |
| $Na_2O + K_2O$ | 0.1–3% |
| $P_2O_5$ | 3–10% | wherein the product has a sintering temperature of at least 950° C. and wherein above 50% by weight of the iron is present as ferrous.

21. A product comprising man-made vitreous fibres wherein the product has a sintering temperature of at least 950° C. and the fibres are formed of a composition which comprises, by weight of oxides:

| | |
|---|---|
| $SiO_2$ | 45–60% |
| $Al_2O_3$ | 1.5–2.5% |
| $TiO_2$ | 0.1–4% |
| FeO | 5–9% |
| CaO | 10–25% |
| MgO | 8–18% |
| $Na_2O$ | 0–2.5% |
| $K_2O$ | 0–2% |
| $Na_2O + K_2O$ | 0.1–3% |
| $P_2O_5$ | 3–10% | and wherein above 50% by weight of the iron is present as ferrous.

* * * * *